F. K. STICKLE.
CONVERTING DEVICE FOR EYEGLASSES AND SPECTACLES.
APPLICATION FILED JULY 29, 1907.
900,444.
Patented Oct. 6, 1908.
2 SHEETS—SHEET 1.
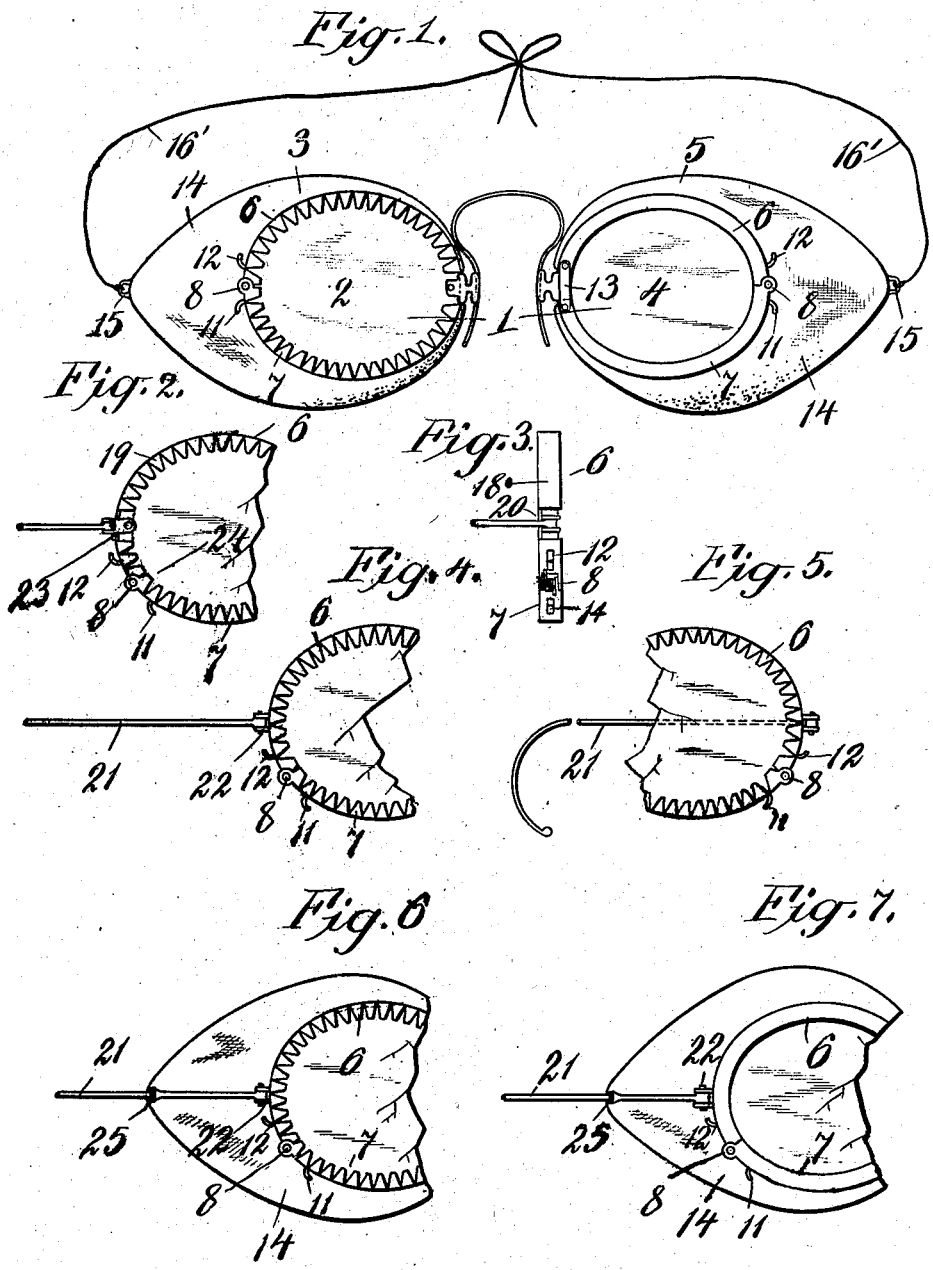
WITNESSES:
INVENTOR
Fred K. Stickle
BY
Nicholas M Goodlett Jr.
His ATTORNEY F. K. STICKLE.
CONVERTING DEVICE FOR EYEGLASSES AND SPECTACLES.
APPLICATION FILED JULY 29, 1907.
900,444.
Patented Oct. 6, 1908.
2 SHEETS—SHEET 2.
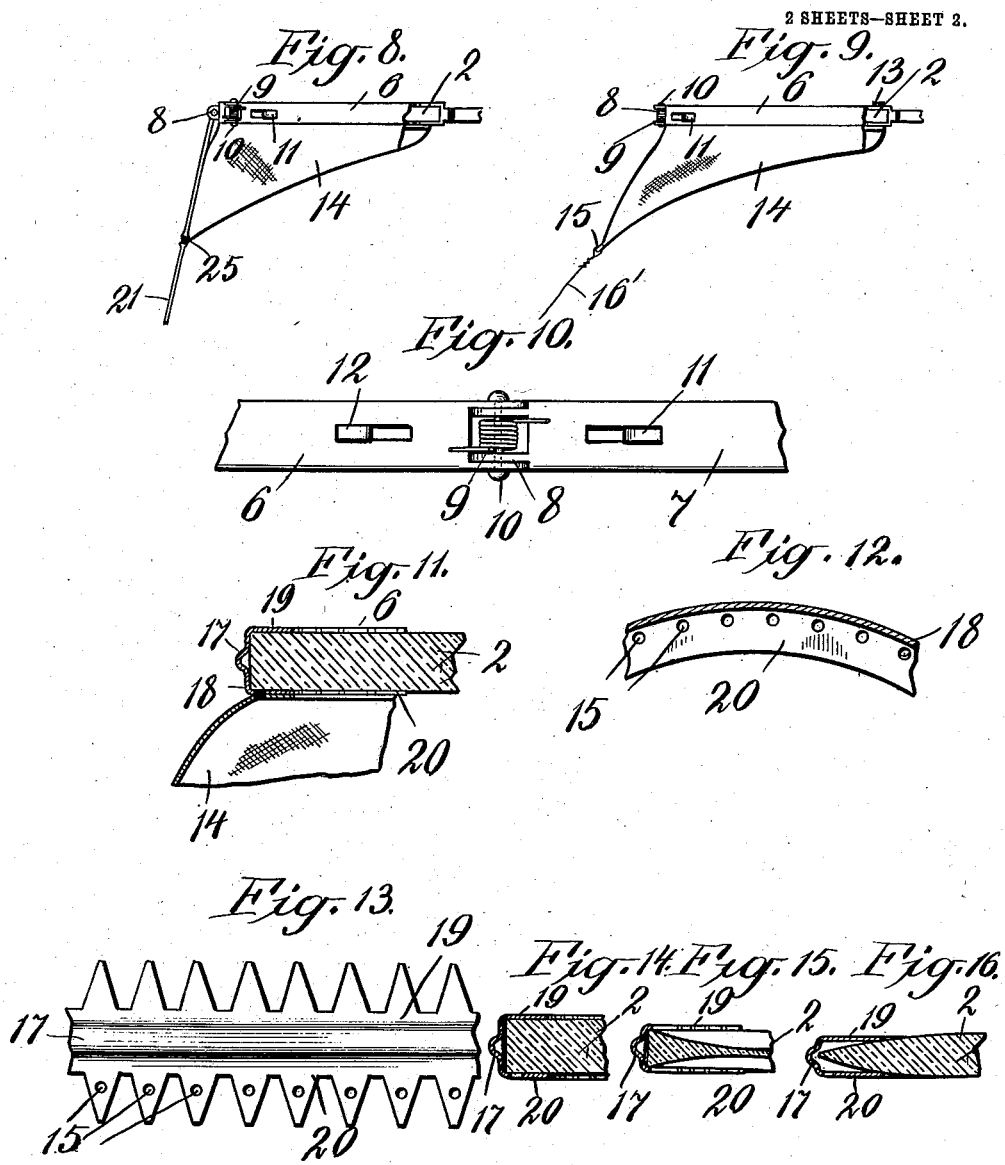
WITNESSES:
INVENTOR
Fred K. Stickle
BY
Nicholas M. Goodlett
His ATTORNEY

UNITED STATES PATENT OFFICE.

FRED K. STICKLE, OF NEW YORK, N. Y.

CONVERTING DEVICE FOR EYEGLASSES AND SPECTACLES.

No. 900,444.  Specification of Letters Patent.  Patented Oct. 6, 1908.

Application filed July 29, 1907. Serial No. 385,976.

*To all whom it may concern:*

Be it known that I, FRED K. STICKLE, a citizen of the United States, and a resident of the borough of Bronx, county, city, and State of New York, have invented certain new and useful Improvements in Converting Devices for Eyeglasses and Spectacles, of which the following is a specification.

This invention relates to certain converting means or attachments for eye lenses, such as those of eye-glasses and spectacles.

An object of the invention is to convert a pair of eye-glasses or a pair of spectacles into secure, serviceable automobile goggles, thus enabling the wearer to enjoy the benefits of his own specially ground lenses without the expense of having his automobile goggles specially fitted with an extra pair of his particular lenses.

A collateral object of the invention is to convert a pair of eye glasses into a pair of spectacles by means of the attachment.

In the embodiment of this invention a readily attachable and detachable frame, preferably comprising two members hinged and spring pressed together, although these two members may be united with any suitable flexible connection or practically comprise a continuous member capable of opening out, serves to clamp about the rim of a lens and is independent of the eye-glass or spectacle construction. A temple and joint may be secured to this frame when the frame is to be used to convert eye-glasses into spectacles. In addition to the temple and joint a gauze or other eye protecting hood may be secured to the frame and temple when it is desired that the device convert eye glasses into automobile goggles. In a preferred construction, the frame is provided with the gauze hood and a portion of the frame is cut away at the proper locality to escape the temple joint which is a permanent fixture with spectacles. In this construction, a cord may be secured to the end of the gauze hood and is adapted to pass about the head of the wearer and be secured to the similar cord extending back from the corresponding hood for the other lens of the pair. This construction is serviceable both for eye-glasses and for spectacles. For use with eye-glasses alone the frame of the device may be fitted with a temple and joint, the gauze being secured directly to the temple and not to a cord as above. Thus, it is evident that in all the modifications of the device there is present a frame to grasp the lens and means for engaging the head of the wearer. When the device is an attachment for converting eye-glasses into spectacles, the temples or ear bows are the means engaging the head of the wearer. When the device is employed to convert eye-glasses or spectacles into goggles, then gauze hoods are provided which may be drawn up into engagement with the head of the wearer and constitute the means for engaging the head of the wearer. In each case this means secures the lenses to the wearer.

Other features of this invention and the construction of the device will be apparent from the following description and the accompanying drawings.

Various embodiments of the invention are shown in the accompanying drawings, which form part of this application, in which like numerals indicate corresponding parts in the several figures, and in which:—

Figure 1 is a front elevation of a pair of eye-glasses the lenses of which are respectively provided with modified types of clamping frames; Fig. 2 is a front elevation with parts broken away showing the location of the hinge and cut out portion of the frame for use with spectacles; Fig. 3 is an edge elevation of the parts shown in Fig. 2; Figs. 4 and 5 are front elevations of a pair of frames provided with temples; Fig. 6 is a view similar to Fig. 4 but showing a gauze goggle hood secured to the frame; Fig. 7 is a view similar to that of Fig. 6 but showing the flanges of the frame members continuous; Fig. 8 is a plan view of the parts shown in Fig. 6; Fig. 9 is a plan view of the parts as shown at the left of Fig. 1; Fig. 10 is a detail view showing the hinge for the frame and the finger lugs; Fig. 11 is a detail section showing a frame member and a portion of the attached hood; Fig. 12 is a detail view showing the perforated rear flange for the type of frame shown at the right of Fig. 1; Fig. 13 is an enlarged detail view of the ribbed frame with scalloped flange construction; and Figs. 14, 15 and 16 are fragmentary sectional views showing the application of a frame member to various thicknesses of lens.

Referring now more in detail to the drawings;—for a complete understanding of applicant's invention, it should be borne in mind that when ordinarily used, the lens frames are made in pairs so as to fit the respective lenses in a pair of eye-glasses or spectacles and may be carried conveniently in a pocket case ready for application to the eye-glasses or spectacles when an occasion arises. In Fig. 1 there is illustrated a pair of eye-glasses 1, the lens 2 of which is fitted with a converting device 3 and the lens 4 of which is fitted with a converting device 5. As obvious from the drawing, the device 3 is not identical with the device 5 but is slightly modified. As actually employed by the wearer, either a pair of devices 3 or a pair of devices 5 would be employed according to which modification suited his fancy. As is obvious from the illustrations, both devices 3 and 5 comprise substantially the same elements although some of these are modified.

Referring now particularly to the device 5, a clamping frame preferably made up of two bowed channel members 6 and 7 is provided. The members 6 and 7 are secured end to end so as to form a continuation one of the other by a flexible connection such as the hinge joint 8 and are spring pressed towards one another preferably by a spiral spring at the joint 8 and indicated by the numeral 9. As shown in Fig. 10, this spring 9 may surround a pin 10 of the hinge 8. On opposite sides of the hinge joint 8 are provided finger engageable lugs 11 and 12. These lugs may be struck out from the members 6 and 7. The members 6 and 7 are bowed so as to conform to the peripheral contour of the eye lens 4. At the opposite ends of the members 6 and 7 from the hinge 8, there may be provided, in any desired form, a releasable catch such as 13. For ordinary use, the spring 9 is sufficient to hold the members 6 and 7 clamped about the rim of the eye lens but, for extremely rough usage or, if no clamping spring is provided, it may be desirable to employ a lock such as the clamp 13. Secured to the inner flanges of the channel members 6 and 7 is a goggle hood or eye protector of gauze or other suitable material and indicated by 14. The inner flanges of the channel members 6 and 7 may be provided with a series of perforations, as indicated by 15 in Fig. 12. Through these perforations, the hood 14 may be stitched to the members 6 and 7 of the clamping frame.

The end of the hood 14 is illustrated as provided with a loop or bail 16 making possible the ready attachment thereto of a cord or elastic 16' designed to pass about the head of the wearer.

Whereas, at the right of Fig. 1, the members 6 and 7 are shown to be plain bowed channel members except for the perforations 15, this is not the case with the corresponding members 6 and 7 of the device 3 at the left of Fig. 1. In this device, the flanges of each channel member are incised so as to form a series of scallops instead of continuous flanges. In this modified construction, it may be well to form a stiffening rib 17 along the web 18 between the flanges 19 and 20. The flange 20 is provided with a series of perforations 15 as was the case with the device 5. The scalloped member, just described, may be best understood from Figs. 11 and 13. The hood 14 may be secured by stitching or otherwise to the members 6 and 7 through the perforations 15 and as indicated in Fig. 11. In the device 3, just described, no catch 13 is shown.

The modified device 3, just described, has functions made possible by the incised or scalloped flanges 19 and 20 which are peculiar to itself. The entire device may be made up with the flanges 19 and 20 extending outwardly in substantially the same plane, (see Fig. 13), when an optician may readily bend the members 6 and 7 properly to conform to the peripheral contour of the particular lens of the glasses which a purchaser may be wearing. The flanges 19 and 20 may then be bent down so as to conform to the exact thickness of that particular lens. This could not so readily be done with the channel members of the device 5. In the construction of the device 3 the rib 17 may, in some instances, be dispensed with but may be serviceable to provide additional stiffness to the clamping members. Figs. 14, 15 and 16 indicate how the blank shown in Fig. 13 may be bent to conform to different types of eye lenses.

Up to this point, the clamping frame comprising members 6 and 7 has been described in connection with an eye protector or goggle hood 14. It is, however, contemplated to employ a similar frame, not necessarily provided with perforations 15, for the purpose of converting a pair of eye-glasses into a pair of spectacles. To this end (see Figs. 4 and 5) two pairs of clamping frames 6, 7 are provided and secured directly to each frame is a temple 21 swiveled upon the attached temple joint 22. For convenience in construction, the flexible connection 8 may be located below the temple joint 22 as indicated in Figs. 4 and 5. In this construction, the clamping members 6 and 7 may be of a scalloped flange type as indicated in Figs. 4 and 5 or they may be of a continuous flange type as shown at the right of Fig. 1. When the frames 6 and 7 are clamped about the lenses of a pair of eye-glasses, the temples 21 may be passed over the ears to engage the wearer's head the same as the temples for an ordinary pair of spectacles, the pair of eye-glasses thereby being converted into spectacles.

In case it is desired that a goggle attachment be provided of such a nature that it may be used with spectacles, which have temples and temple joints permanently secured to the lenses thereof, it is necessary slightly to modify the constructions shown in Fig. 1 and described above. Figs. 2 and 3 illustrate such a modification enabling the clamping frame to be used with spectacles. In this construction, the hinge joint 8 must be located so as not to coincide with the position of the permanently attached temple joint 23 of the lens 24. It may be located slightly below the same as shown in Figs. 2 and 3. Corresponding to the position of the temple joint 23, a portion of the front flange 19 and a portion of the web 18 of one of the clamping members, 6 as illustrated, is cut away so as to allow the ready and unobstructed entrance of the temple joint 23. The flange 20 may be scalloped throughout the greater portion of its extent but at the locality lying next to the temple joint 23, where the flange 19 and the web 18 are cut away, this flange 20 should be made continuous, that is, not scalloped or incised since this flange alone serves to secure the upper portion of the clamping member 6 to the lower portion thereof extending to the hinge 8. If desired, this portion of the flange 20 may be reinforced. It should be understood also that, when the clamping members 6 and 7 are constructed incised or scalloped, as illustrated, they may readily be fitted by an optician to any lens no matter what its contour or size, of course, within reasonable limits. If desired, this eye-glass converting construction may be formed with the clamping members 6 and 7 in the form of channel members with continuous flanges as is illustrated at the right of Fig. 1. Although Figs. 2 and 3 illustrate merely the clamping frames and fragments of a spectacle in combination therewith, it is to be understood that the clamping frames are to be provided with goggle hoods such as those illustrated and described in connection with Fig. 1.

Figs. 6 and 7 illustrate modifications of the converting device adapted to convert eye-glasses into goggles. Fig. 6 shows a clamping frame 6, 7 made in accordance with that illustrated in Fig. 4 but provided with a goggle hood or eye protector 14 which is secured by means of a lashing 25 directly to the temple 21 so that a cord or an elastic 16' may be dispensed with. Fig. 7 shows a construction very similar to Fig. 6 except that the clamping members 6 and 7 are of the continuous flange channel type which do not so readily permit of a change in their contour to conform to varying types of lenses.

It is to be understood that the devices just described are equally applicable to frameless eye-glasses or spectacles and to eye-glasses provided with frames, that is, bands completely inclosing the lenses and that the eye-glasses or spectacles may be of any ordinary construction no special frame for the lenses being required. The particular contour of the scalloping of the flanges 19 and 20, shown in the drawings, may obviously be modified so long as suitable incisions are made in the flanges. The elementary type has been illustrated. It is also to be understood that various combinations of the features above described may be embodied in a finished pair of converting devices in accordance with this invention. As has been described, the converting devices are to be employed in pairs, just as lenses for a pair of eye-glasses are employed in pairs in which case it would be convenient to provide a suitable pocket carrying case for a pair of applicant's converting devices. If, for convenience, it is desired to attach one of these to the other, this is contemplated as within applicant's invention. A bar may be provided bridging across between any two similar clamping members such as 6 or 7.

It is preferred that the clamping frame be made of sheet metal in which case it may be gold filled or otherwise finished to present a pleasing appearance.

What is claimed and what is desired to be secured by Letters Patent is:—

1. A pair of eye lenses secured one to the other by a nose bridge in combination with a pair of converting members, said members each comprising a two piece hinged frame for ready attachment to and removal from the rim of the eye lens and rearwardly extending means secured to said frame for engaging the head of the wearer and capable of being secured thereto, so that said members when combined with said eye lenses will convert the original eye lens construction into one having additional functions.

2. A converting member for an eye lens comprising a readily attachable and detachable frame; said frame comprising two lens-rim clamping curved members, a hinge joint for said members, a spring for clamping said members towards one another; and means secured to said frame for engaging the head of the wearer and securing said lens in position.

3. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; and a finger engageable lug projecting from one of said channel members adjacent to said hinge joint for readily moving said members into open position.

4. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a spring for clamping said channel members upon said lens; and a finger engageable lug projecting from one of said channel members adjacent to said hinge joint for readily moving said members into open position.

5. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a clasp for holding said channel members locked together; and a finger engageable lug projecting from each of said channel members adjacent to said flexible connection for readily moving said members into open position.

6. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a spring for clamping said channel members upon said lens; a clasp for holding said channel members locked together; and a finger engageable lug projecting from each of said channel members adjacent to said hinge joint for readily moving said members into open position.

7. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; and the flanges of said channel members being scalloped by the provision of suitable incisions so that the channel members may readily be fitted to conform to many types and sizes of eye lenses.

8. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; the flanges of said channel members being scalloped by the provision of suitable incisions so that the channel members may readily be fitted to conform to many types and sizes of eye lenses; and a finger engageable lug projecting from each of said channel members adjacent to said flexible connection for readily moving said members into open position.

9. In a device for temporarily converting eye glasses and spectacles into goggles, a readily attachable and detachable frame for an eye lens, said frame comprising two oppositely bowed channel members for inclosing the rim of said lens; and a flexible connection securing said channel members end to end; a portion of one flange and of the web of one of said channel members being cut away to permit the entrance and exit of a temple joint fixed to the eye lens of a spectacle construction.

10. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a portion of one flange and of the web of one of said channel members being cut away to permit the entrance and exit of a temple joint fixed to the eye lens of a spectacle construction; and a finger engageable lug projecting from one or more of said channel members adjacent to said flexible connection for readily moving said members into open position.

11. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a portion of one flange and of the web of one of said channel members being cut away to permit the entrance and exit of a temple joint fixed to the eye lens of a spectacle construction; and the flanges of said channel members being scalloped by the provision of suitable incisions, a portion of one flange corresponding in position with the temple joint of the spectacles being continuous, so that the channel members may readily be fitted to conform to many types and sizes of eye lenses.

12. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a portion of one flange and of the web of one of said channel members being cut away to permit the entrance and exit of a temple joint fixed to the eye lens of a spectacle construction; the flanges of said channel members being scalloped by the provision of suitable incisions, a portion of one flange corresponding in position with the temple joint of the spectacles being continuous, so that the channel members may readily be fitted to conform to many types and sizes of eye lenses; and a finger engageable lug projecting from one or more of said channel members adjacent to said flexible connection for readily moving said members into open position.

13. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a finger engageable lug projecting from one or more of said channel members adjacent to said flexible connection for readily moving said members into open position; and a goggle hood secured to said channel members of said frame for engaging the head of the wearer and protecting his eye.

14. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a spring for clamping said channel members upon said lens; and a goggle hood secured to said channel members of said frame for engaging the head of the wearer and protecting his eye.

15. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a spring for clamping said channel members upon said lens; a finger engageable lug projecting from one or more of said channel members adjacent to said flexible connection for readily moving said members into open position; and a goggle hood secured to said channel members of said frame for engaging the head of the wearer and protecting his eye.

16. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a lock for holding said channel members locked together; and a goggle hood secured to said channel members of said frame for engaging the head of the wearer and protecting his eye.

17. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a lock for holding said channel members locked together; a finger engageable lug projecting from one of said channel members adjacent to said hinge joint for readily moving said members into open position; and a goggle hood secured to said channel members of said frame for engaging the head of the wearer and protecting his eye.

18. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; a spring for clamping said channel members upon said lens; a finger engageable lug projecting from one or more of said channel members adjacent to said flexible connection for readily moving said members into open position; and a goggle hood secured to said channel members of said frame for engaging the head of the wearer and protecting his eye.

19. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; the flanges of said channel members being scalloped by the provision of suitable incisions so that the channel members may readily be fitted to conform to many types and sizes of eye lenses; and a goggle hood secured to said channel members of said frame for engaging the head of the wearer and protecting his eye.

20. In a device for temporarily converting eye glasses and spectacles into goggles, a readily attachable and detachable frame for an eye lens, said frame comprising two oppositely bowed channel members for inclosing the rim of said lens; a flexible connection securing said channel members end to end; the flanges of said channel members being scalloped by the provision of suitable incisions so that the channel members may readily be fitted to conform to many types and sizes of eye lenses; a finger engageable lug projecting from one or more of said channel members adjacent to said flexible connection for readily moving said members into open position; and a goggle hood secured to said channel members for engaging the head of the wearer and protecting his eye.

21. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a portion of one flange and of the web of one of said channel members being cut away to permit the entrance and exit of a temple joint fixed to the eye lens of a spectacle construction; and a goggle hood secured to said channel members of said frame for engaging the head of the wearer and protecting his eye.

22. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a portion of one flange and of the web of one of said channel members being cut away to permit the entrance and exit of a temple joint fixed to the eye lens of a spectacle construction; a finger engageable lug projecting from each of said channel members adjacent to said hinge joint for readily moving said members into open position; and a goggle hood secured to said channel members of said frame for engaging the head of the wearer and protecting his eye.

23. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a portion of one flange and of the web of one of said channel members being cut away to permit the entrance and exit of a temple joint fixed to the eye lens of a spectacle construction; the flanges of said channel members being scalloped by the provision of suitable incisions, a portion of one flange corresponding in position with temple joint of the spectacles being continuous, so that the channel members may readily be fitted to conform to many types and sizes of eye glasses; and a goggle hood secured to said channel members of said frame for engaging the head of the wearer and protecting his eye.

24. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a portion of one flange and of the web of one of said channel members being cut away to permit the entrance and exit of a temple joint fixed to the eye lens of a spectacle construction; the flanges of said channel members being scalloped by the provision of suitable incisions, a portion of one flange corresponding in position with temple joint of the spectacles being continuous, so that the channel members may readily be fitted to conform to many types and sizes of eye glasses; a finger engageable lug projecting from each of said channel members adjacent to said hinge joint for readily moving said members into open position; and a goggle hood secured to said channel members of said frame for engaging the head of the wearer and protecting his eye.

25. In a device for temporarily converting eye glasses into goggles, a readily attachable and detachable frame for an eye lens, said frame comprising two oppositely bowed channel members for inclosing the rim of said lens; a hinge joint securing said channel members end to end; a goggle hood secured to said channel members of said frame for engaging the head of the wearer and protecting his eye; and a temple and temple joint secured to one of said channel members and to the adjacent end of the goggle hood.

26. In a device for temporarily converting eye glasses into goggles, a readily attachable and detachable frame for an eye lens, said frame comprising two oppositely bowed channel members for inclosing the rim of said lens; a hinge joint securing said channel members end to end; a finger engageable lug projecting from each of said channel members adjacent to said hinge joint for readily moving said members into open position; a goggle hood secured to said channel members of said frame for engaging the head of the wearer and protecting his eye; and a temple and temple joint secured to one of said channel members and to the adjacent end of the goggle hood.

27. In a device for temporarily converting eye glasses into goggles, a readily attachable and detachable frame for an eye lens, said frame comprising two oppositely bowed channel members for inclosing the rim of said lens; a hinge joint securing said channel members end to end; a spring for clamping said channel members upon said lens; a goggle hood secured to said channel members of said frame for engaging the head of the wearer end protecting his eye; and a temple and temple joint secured to one of said channel members and to the adjacent end of the goggle hood.

28. In a device for temporarily converting eye glasses into goggles, a readily attachable and detachable frame for an eye lens, said frame comprising two oppositely bowed channel members for inclosing the rim of said lens; a hinge joint securing said channel members end to end; a spring for clamping said channel members upon said lens; a finger engageable lug projecting from each of said channel members adjacent to said hinge joint for readily moving said members into open position; a goggle hood secured to said channel members of said frame for engaging the head of the wearer and protecting his eye; and a temple and temple joint secured to one of said channel members and to the adjacent end of the goggle hood.

29. In a device for temporarily converting eye glasses into goggles, a readily attachable and detachable frame for an eye lens, said frame comprising two oppositely bowed channel members for inclosing the rim of said lens; a hinge joint securing said channel members end to end; a clasp for holding said channel members locked together; a goggle hood secured to said channel members of said frame for engaging the head of the wearer and protecting his eye; a temple and temple joint secured to one of said channel members and to the adjacent end of the goggle hood.

30. In a device for temporarily converting eye glasses into goggles, a readily attachable and detachable frame for an eye lens, said frame comprising two oppositely bowed channel members for inclosing the rim of said lens; a hinge joint securing said channel members end to end; a clasp for holding said channel members locked together; a finger engageable lug projecting from each of said channel members adjacent to said hinge joint for readily moving said members into open position; a goggle hood secured to said channel members of said frame for engaging the head of the wearer and protecting his eye; a temple and temple joint secured to one of said channel members and to the adjacent end of the goggle hood.

31. In a device for temporarily converting eye glasses into goggles, a readily attachable and detachable frame for an eye lens, said frame comprising two oppositely bowed channel members for inclosing the rim of said lens; a hinge joint securing said channel members end to end; a spring for clamping said channel members locked together; a goggle hood secured to said channel members of said frame for engaging the head of the wearer and protecting his eye; and a temple and temple joint secured to one of said channel members and to the adjacent end of the goggle hood.

32. In a device for temporarily converting eye glasses into goggles, a readily attachable and detachable frame for an eye lens, said frame comprising two oppositely bowed channel members for inclosing the rim of said lens; a hinge joint securing said channel members end to end; a spring for clamping said channel members end to end; a clasp for holding said channel members locked together; a finger engageable lug projecting from each of said channel members adjacent to said hinge joint for readily moving said members into open position; a goggle hood secured to said channel members of said frame for engaging the head of the wearer and protecting his eye; and a temple and temple joint secured to one of said channel members and to the adjacent end of the goggle hood.

33. In a device for temporarily converting eye glasses into goggles, a readily attachable and detachable frame for an eye lens, said frame comprising two oppositely bowed channel members for inclosing the rim of said lens; a hinge joint securing said channel members end to end; the flanges of said channel members being scalloped by the provision of suitable incisions so that the channel members may readily be fitted to conform to many types and sizes of eye lenses; a finger engageable lug projecting from each of said channel members adjacent to said hinge joint for readily moving said members into open position; a goggle hood secured to said channel members of said frame for engaging the head of the wearer and protecting his eye; and a temple secured to one of said channel members and to the adjacent end of the goggle hood.

34. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a portion of one flange and of the web of one of said channel members being cut away to permit the entrance and exit of a temple joint fixed to the eye lens of the spectacle construction; a goggle hood secured to said channel members of said frame for engaging the head of the wearer and protecting his eye; and a cord extending from the end of said hood engaging the head of the wearer to secure the hood in position.

35. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a portion of one flange and of the web of one of said channel members being cut away to permit the entrance and exit of a temple joint fixed to the eye lens of the spectacle construction; a finger engageable lug projecting from each of said channel members adjacent to said hinge joint for readily moving said members into open position; a goggle hood secured to said channel members of said frame for engaging the head of the wearer and protecting his eye; and a cord extending from the end of said hood for engaging the head of the wearer to secure the hood in position.

36. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a portion of one flange and of the web of one of the channel members being cut away to permit the entrance and exit of a temple joint fixed to the eye lens of a spectacle construction; the flanges of said channel members being scalloped by the provision of suitable incisions, a portion of one flange corresponding in position with the temple joint of the spectacles being continuous, so that the channel members may readily be fitted to conform to many types and sizes of eye glasses; a goggle hood secured to said channel members of said frame for engaging the head of the wearer and protecting his eye; and a cord extending from the end of said hood for engaging the head of the wearer to secure the hood in position.

37. In a device for temporarily converting eye glasses and spectacles into goggles, a readily attachable and detachable frame for an eye lens, said frame comprising two oppositely bowed channel members for inclosing the rim of said lens; a hinge joint securing said channel members end to end; a portion of one flange and of the web of one of said channel members being cut away to permit the entrance and exit of a temple joint fixed to the eye lens of a spectacle construction; the flanges of said channel members being scalloped by the provision of suitable incisions, a portion of one flange corresponding in position with the temple joint of the spectacles being continuous, so that the channel members may readily be fitted to conform to many types and sizes of eye glasses; a finger engageable lug projecting from one of said channel members adjacent to said hinge joint for readily moving said members into open position; a goggle hood secured to said channel members of said frame for engaging the head of the wearer and protecting his eye; and a cord extending from the end of said hood for engaging the head of the wearer to secure the hood in position.

38. A goggle converting device for an eye lens construction comprising an openable and detachable channeled frame for clasping about the rim of the eye lens and an eye protecting hood secured to said frame.

39. A goggle converting device for an eye lens construction comprising an openable and detachable channeled frame for clasping about the rim of the eye lens; means for holding said frame in closed position; and an eye protecting hood secured to said frame.

40. A goggle converting device for an eye lens construction comprising an openable and detachable channeled frame for clasping about the rim of the eye lens and an eye protecting hood secured to said frame; and rearwardly extending means for securing said hood to the head of the wearer.

41. A goggle converting device for an eye lens construction comprising an openable and detachable channeled frame for clasping about the rim of the eye lens; means for holding said frame in closed position; an eye protecting hood secured to said frame; and rearwardly extending means for securing said hood to the head of the wearer.

In testimony whereof, I have signed my name to this specification, in the presence of two subscribing witnesses.

FRED K. STICKLE.

Witnesses:
IDA G. GILMORE,
LEONARD DAY.